June 16, 1936.  E. A. SPERRY, JR., ET AL  2,044,151
ARTIFICIAL HORIZON
Filed Jan. 16, 1935  3 Sheets-Sheet 1

INVENTORS
ELMER A. SPERRY, JR.
BERT G. CARLSON
MORTIMER F. BATES
BY Herbert H. Thompson
THEIR ATTORNEY.

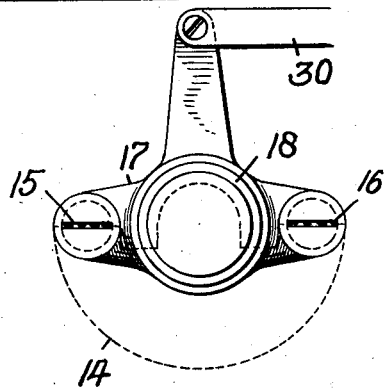
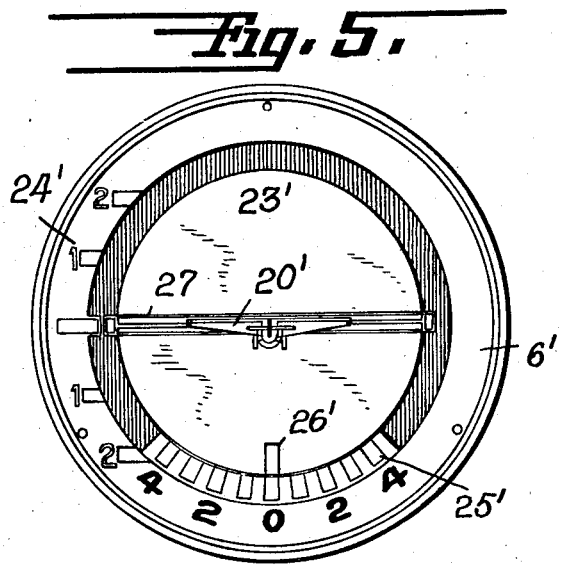
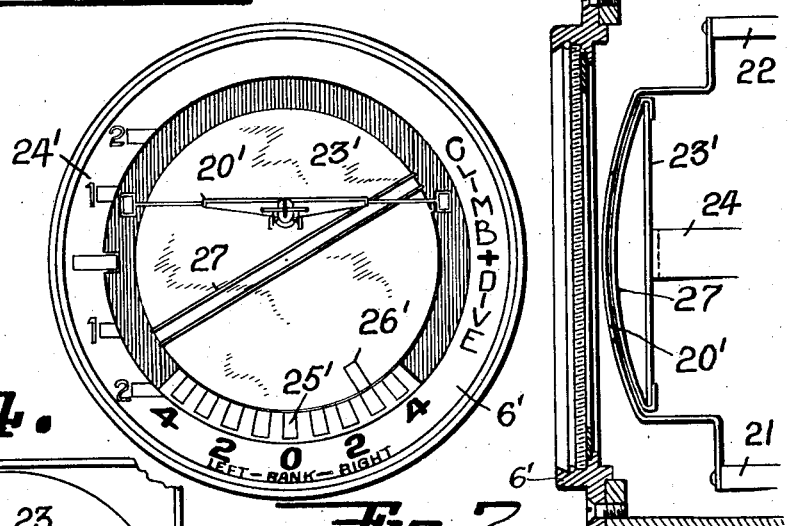
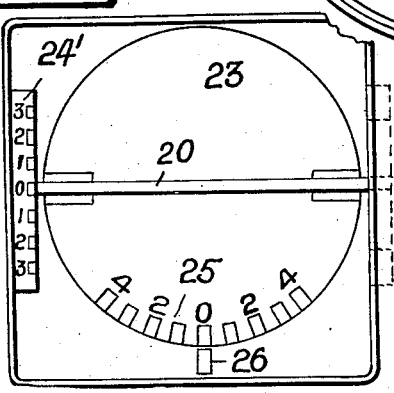

June 16, 1936.  E. A. SPERRY, JR., ET AL  2,044,151
ARTIFICIAL HORIZON
Filed Jan. 16, 1935   3 Sheets-Sheet 3

INVENTORS
ELMER A. SPERRY, JR.
BERT G. CARLSON
MORTIMER F. BATES

BY
Herbert H. Thompson
THEIR ATTORNEY.

UNITED STATES PATENT OFFICE 2,044,151

ARTIFICIAL HORIZON

Elmer A. Sperry, Jr., Brooklyn, Bert G. Carlson, Bellerose, and Mortimer F. Bates, Brooklyn, N. Y., assignors to Sperry Gyroscope Company, Inc., Brooklyn, N. Y., a corporation of New York Application January 16, 1935, Serial No. 2,048
In Great Britain August 15, 1933

6 Claims. (Cl. 33—204)

This invention relates to attitude indicators for aircraft, especially to the type generally known as artificial horizons. In our Patent No. 1,992,970, for Hydro-pneumatic automatic pilot for aircraft, dated March 5, 1935, the gyro-vertical used as a base for operating the automatic pilot is also employed as a horizon indicator, being mounted on the instrument panel for that purpose. The present application pertains more particularly to the horizon indicator features of this type of gyroscope, the present application being a continuation, in part, of the aforesaid prior joint application.

Referring to the drawings disclosing two forms our invention may assume,

Fig. 3 is a detail of the air pick-off connected therefrom to the servo motors.

Fig. 4 is a face view of the same as it appears from in front of the instrument panel.

Fig. 5 is a face view of a modified form of indicator.

Fig. 6 is a similar view of the same indicator, showing the position of the parts when the aircraft is climbing and banking to the right.

Fig. 7 is a plan view, partly in section, of the forward portion of the horizon of Figs. 5 and 6.

Figure 1:
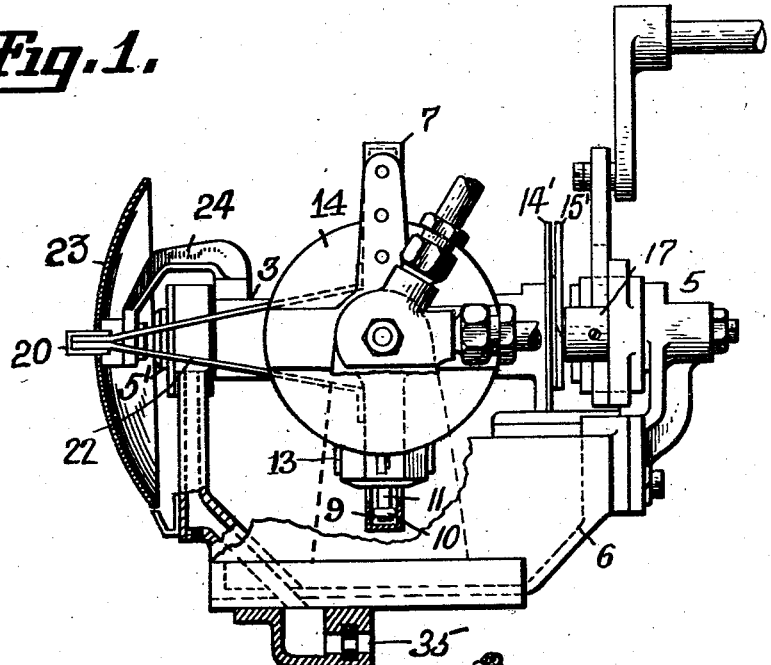
Fig. 1 is a side elevation of the gyroscopic artificial horizon adapted to be mounted on the back of the instrument panel.
Figure 2:
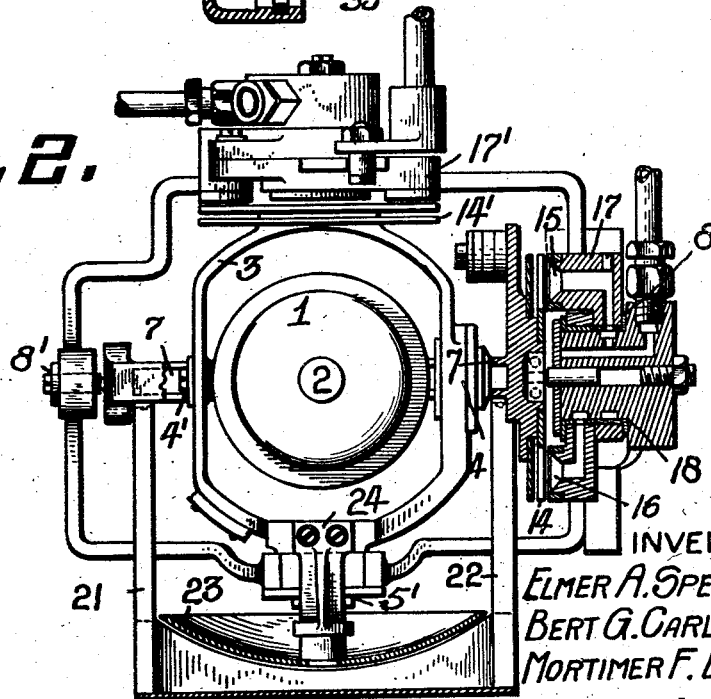
Fig. 2 is a plan view of the same.
Figure 8:
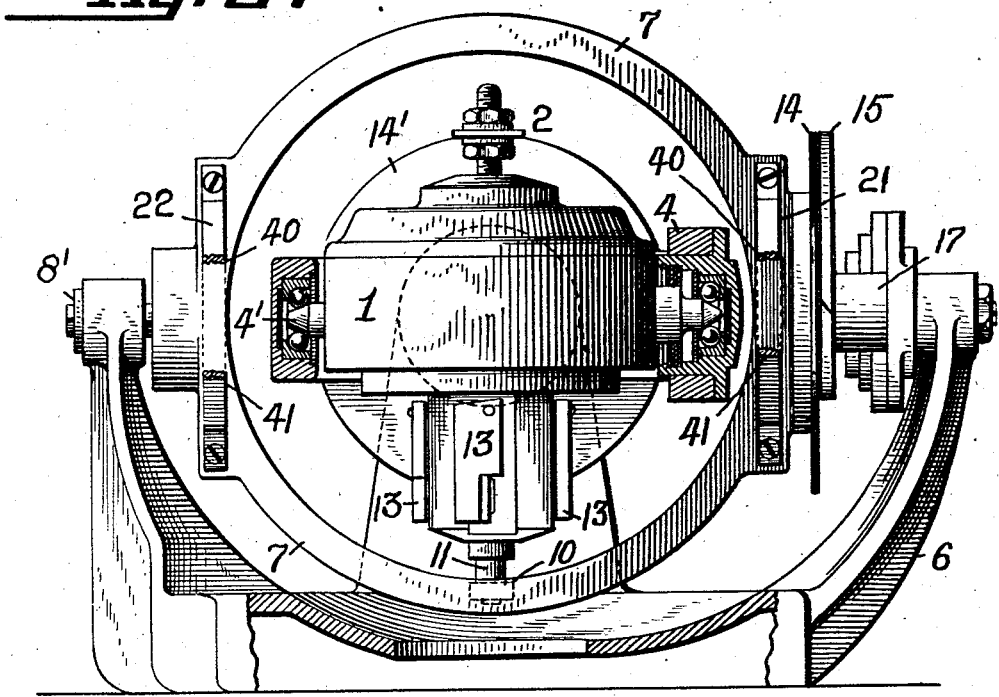
Fig. 8 is a front elevation of the gyroscope proper, the indicators at the front being broken away and parts shown in section.

The gyroscope proper is shown as comprising a rotor bearing casing 1, within which the rotor (not shown) is mounted for spinning about a normally vertical axis 2, the air for spinning the rotor being supplied through pipe coupling 35. In this instance the casing is pivoted within the gimbal ring 3 on a transverse axis 4—4' and the gimbal ring, in turn, is mounted for oscillation about a fore and aft axis 5—5' within a fixed framework or casing 6. A loop or bail 7 is independently pivoted within said framework on a transverse axis 8—8' normally parallel to the axis 4—4'. Said bail is provided with a trackway 9 in which a roller 10 is guided, said roller being secured to an extension 11 from the gyro casing 12.

The gyroscope is shown as erected by air erecting means controlled by small pendulums 13, shown more in detail in the prior patent to Carlson, No. 1,982,637, dated December 4, 1934. For controlling the airplane in elevation, a semicircular disc 14 is shown as mounted on one end of the bail 7 and air ports 15 and 16 are provided in a rotatable member 17 mounted on a trunnion 18 adjacent thereto. A follow-up connection is provided through link 30 (Fig. 3), which rotates the member 17 slightly with respect to disc 14. A similar arrangement is provided about the fore and aft axis by means of a cut-off disc 14' secured to the gimbal ring 3 and air port member 17' adjacent thereto. Since this invention relates only to the indicators, reference may be had to applicants' aforesaid prior joint application for a more complete description of the automatic pilot features of the invention.

To act as a horizon indicator, we have shown a transverse member or bar 20 secured to a pair of forward extensions 21, 22, each in the form of a pair of triangular legs 40 and 41 secured at their base to the bail 7, which is shown as extending both above and below the gyroscope. The member 20, which is stabilized against pitching, will therefore appear to move up and down upon pitching of the aircraft. In other words, the bar will appear to move down when the aircraft pitches down and will appear to move up when the airplane climbs upwardly, since the instrument is placed on the panel in front of the aviator and the aviator views the instrument from the rear.

In order to show bank, we mount a convex disc 23 on a goose neck 24 secured to the gimbal ring 3 and extending over the top of the pivot 5'. Said disc will therefore be stabilized laterally by the gyroscope and will, therefore, apparently turn in the opposite direction from the banking of the craft. Reference numerals 24' may be provided at the side to be read in connection with the movements of the bar 20 to show the amount of climb and dive, and angular indications 25 to show bank in connection with a reference mark 26 on the casing.

The preferred form of the indicator is shown in Figs. 5, 6 and 7, the first two figures of which show the face of the instrument as it appears to the aviator, that is, that part including and adjacent the observation opening of the instrument. In this case the bar, which moves up and down with arms 21 and 22, is made to simulate a miniature aircraft 20' in appearance, and the convex rotatable disc is replaced by a flat disc 23' secured to goose neck 24 and a pair of bowed, normally horizontal parallel wires 27 secured to said disc which lie directly behind airplane 20' to avoid parallax. Said wires 27 represent datum or the horizon to the aviator. (Figs. 5 and 7). Also, preferably the angular indications 25' are placed on the fixed casing 6' and the reference index 26' on the movable disc 23'. By this or equivalent arrangement the miniature airplane, which is interpreted by the aviator as the movable indicator in all cases, showing the attitude of the craft, will appear to move in the direction that the forward portion of the airplane appears to move for both roll and pitch, so that confusion in interpreting is avoided without actually reversing the movement of the indicators about either horizontal axis. Thus, when the airplane climbs, the indicator 20' will move up, as shown in Fig. 6, with reference to the reference wires 27. In case, however, the plane banks to the right, that is, the right wing dips down the right wing of the indicator 20' will also apparently dip down, as shown in Fig. 6, due to the fact that the reference marks 27 have rotated counter-clockwise with reference thereto. The aviator may also read the amount of bank by reading index 26' on indications 25', and the amount of the climb or dive by reading the end of or wing tip of miniature airplane 20' on indications 24'.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. An artificial horizon for aircraft adapted to be placed on the instrument panel in front of the pilot, comprising a gyro element proper, a gimbal ring within which said element is pivoted on a normally horizontal transverse axis, a fixed frame in which said gimbal ring is mounted on a fore and aft axis, a bail pivoted on an axis in said frame normally in line with said first named axis, a horizontal bar at the face of the horizon secured to said bail to be stabilized thereby about said transverse axis, a fixed index cooperating therewith, a mask secured to the gimbal ring to be stabilized thereby about said fore and aft axis, said mask being mounted behind said bar, and bank indicating means on said mask.

2. An artificial horizon for aircraft adapted to be placed on the instrument panel in front of the pilot, comprising a gyro element proper, a gimbal ring within which said element is pivoted on a normally horizontal transverse axis, a fixed frame in which said gimbal is mounted on a fore and aft axis, a bail pivoted on an axis in said frame normally in line with said first named axis, a transverse indicator representing an aircraft or part thereof at the face of the horizon secured to said bail to be stabilized thereby about said transverse axis, a fixed index cooperating therewith, a mask secured to the gimbal ring to be stabilized thereby about said fore and aft axis, said mask being mounted behind said bar, and a horizontal reference member on said mask, whereby said indicator appears to move relatively to said reference member in the same sense as the aircraft moves relatively to the horizon upon both pitch and roll of the craft.

3. An artificial horizon for aircraft adapted to be placed on the instrument panel in front of the pilot, comprising a gyro element proper, a gimbal ring within which said element is pivoted on a normally horizontal transverse axis, a fixed frame in which said gimbal is mounted on a fore and aft axis, a transversely extending vertically movable indicator representing an aircraft or part thereof at the face of the instrument, means connecting said indicator with said gyroscope to be stabilized thereby about said transverse axis during climb and dive of the aircraft, respectively, a mask secured to said gimbal ring and stabilized thereby about said fore and aft axis, and a horizontal reference member on said mask adapted to represent the horizon with reference to said indicator, whereby said indicator appears to move in the same sense as the aircraft upon both pitch and roll of the craft.

4. In an artificial horizon for aircraft, a universally mounted gyroscope adapted to be mounted in front of the aviator, a normally horizontal indicator representing the aircraft at the face of the horizon, and stabilized against pitching only by said gyroscope, and a second normally horizontal reference indicator representing the horizon at said face, and stabilized against rolling or banking only by said gyroscope, whereby said first indicator appears to move in the same sense as the aircraft moves relatively to the horizon upon both pitch and roll of the aircraft.

5. In an artificial horizon for aircraft, a universally mounted gyroscope adapted to be mounted in front of the aviator, a normally horizontal indicator representing the aircraft at the face of the horizon, and stabilized against pitching only by said gyroscope, angle of pitch graduations on which said indicator is readable, a second normally horizontal indicator representing the horizon at said face, and stabilized against rolling or banking only by said gyroscope, and banking angle graduations on which said second indicator is readable.

6. In an artificial horizon for aircraft, a universally mounted gyroscope adapted to be mounted in front of the aviator, a normally horizontal indicator at the face of the horizon and stabilized against pitching only by said gyroscope, angle of pitch graduations on which said indicator is readable, a second normally horizontal indicator at said face and stabilized against rolling or banking only by said gyroscope, and banking angle graduations on which said second indicator is readable, one of said indicators being in a form to represent an aircraft and the other simulating the horizon line.

ELMER A. SPERRY, Jr.
BERT G. CARLSON.
MORTIMER F. BATES.